(12) United States Patent
Meixner

(10) Patent No.: US 9,902,261 B2
(45) Date of Patent: *Feb. 27, 2018

(54) TRANSMISSION DEVICE FOR A MOTOR VEHICLE

(71) Applicant: Audi AG, Ingolstadt (DE)

(72) Inventor: Christian Meixner, Ingolstadt (DE)

(73) Assignee: AUDI AG, Ingolstadt (DE)

(*) Notice: Subject to any disclaimer, the term of this patent is extended or adjusted under 35 U.S.C. 154(b) by 236 days.

This patent is subject to a terminal disclaimer.

(21) Appl. No.: 14/440,020

(22) PCT Filed: Oct. 24, 2013

(86) PCT No.: PCT/EP2013/003206
§ 371 (c)(1),
(2) Date: Apr. 30, 2015

(87) PCT Pub. No.: WO2014/067639
PCT Pub. Date: May 8, 2014

(65) Prior Publication Data
US 2015/0291026 A1    Oct. 15, 2015

(30) Foreign Application Priority Data
Nov. 2, 2012 (DE) .......................... 10 2012 021 513

(51) Int. Cl.
*B60K 17/346* (2006.01)
*F16H 48/05* (2012.01)

(52) U.S. Cl.
CPC ........ *B60K 17/346* (2013.01); *B60K 17/3462* (2013.01); *F16H 48/05* (2013.01)

(58) Field of Classification Search
None
See application file for complete search history.

(56) References Cited

U.S. PATENT DOCUMENTS 3,053,404 A    9/1962   Beck et al.
3,343,620 A    9/1967   Karavias
(Continued)

FOREIGN PATENT DOCUMENTS

DE    102010012085    12/2011
WO    WO 91/06787    5/1991

OTHER PUBLICATIONS

Chinese Search Report dated Aug. 3, 2016 with respect to counterpart Chinese patent application 201380056774.X.
(Continued)

*Primary Examiner* — Erin D Bishop
*Assistant Examiner* — Lori Wu
(74) *Attorney, Agent, or Firm* — Henry M. Feiereisen LLC

(57) ABSTRACT

A transmission device of a motor vehicle is disclosed, wherein the motor vehicle has a first wheel axle and a second wheel axle, and wherein the second wheel axle consists of at least one first subaxle and one second subaxle. The transmission device has a first connecting shaft which is operatively connectable to the first subaxle a second connecting shaft which is operatively connectable to the second partial axle and a coupler mechanism having a drive shaft which is operatively connectable to a drive unit of the motor vehicle and an output shaft which is operatively connectable to the first wheel axle, wherein the drive shaft is operatively connected via the coupler mechanism in a torque-dividing manner to the output shaft and to the first and the second connecting shafts.

16 Claims, 3 Drawing Sheets

(56) References Cited

U.S. PATENT DOCUMENTS

| | | | |
|---|---|---|---|
| 5,127,887 A | 7/1992 | Nuttall | |
| 5,492,189 A | 2/1996 | Kriegler et al. | |
| 5,947,858 A * | 9/1999 | Williams | B60K 17/3467 180/247 |
| 6,251,037 B1 | 6/2001 | Baumgaertner et al. | |
| 8,727,927 B2 | 5/2014 | Meixner | |
| 2003/0024753 A1* | 2/2003 | Maruyama | B60K 17/346 180/248 |
| 2006/0135307 A1 | 6/2006 | Lim et al. | |
| 2007/0087889 A1* | 4/2007 | Rosemeier | B60K 17/344 475/205 |
| 2008/0242498 A1 | 10/2008 | Miller et al. | |
| 2013/0017921 A1 | 1/2013 | Meixner | |

OTHER PUBLICATIONS

Translation of Chinese Search Report dated Aug. 3, 2016 with respect to counterpart Chinese patent application 201380056774.X.
International Search Report issued by the European Patent Office in International Application PCT/EP2013/003206 dated Jan. 15, 2015.

* cited by examiner

TRANSMISSION DEVICE FOR A MOTOR VEHICLE

CROSS-REFERENCES TO RELATED APPLICATIONS

This application is the U.S. National Stage of International Application No. PCT/EP2013/003206, filed Oct. 24, 2013, which designated the United States and has been published as International Publication No. WO 2014/067639 and which claims the priority of German Patent Application, Serial No. 10 2012 021 513.4, filed Nov. 2, 2012, pursuant to 35 U.S.C. 119(a)-(d).

BACKGROUND OF THE INVENTION

The invention relates to a transmission device for a motor vehicle, wherein the motor vehicle has a first wheel axle and a second wheel axle, and wherein the second wheel axle consist of at least a first subaxle and a second subaxle.

Such a transmission device serves for example for transmitting a torque between a drive aggregate of the motor vehicle and the at least two wheel axles of the motor vehicle. Thus the first wheel axle and also the second wheel axle are connected to the drive aggregate via the transmission device. They are thus driven wheel axles, providing for example all-wheel drive capability for the motor vehicle. The first wheel axle is for example a front axle of the motor vehicle, while the second wheel axle forms the rear axle of the motor vehicle. However, the opposite configuration is also possible. In such transmission devices a connecting shaft can for example be provided in order to transmit the torque to the second wheel axle, wherein the connecting shaft is in particular constructed as a cardan shaft. In order to achieve good driving properties, a differential usually has to be assigned to the second wheel axle, which differential is connected to the connecting shaft and divides the torque, which is provided via the transmission device between the first subaxle and the second subaxle. The differential is thus provided in the operative connection between the connecting shaft and the second wheel axle. However, the differential requires a substantial amount of space.

SUMMARY OF THE INVENTION

It is an object of the invention to set forth a transmission device, which does not have the aforementioned disadvantage, but enables a compact configuration of the second wheel axle, wherein preferably no differential is provided between the connecting shaft and the second wheel axle.

According to the invention, this is achieved with a transmission device with the features of the independent claim. Hereby a first connecting shaft, which is connectable with the first subaxle is provided, a second connecting shaft which can be operatively connected with the second subaxle, and a coupler mechanism with a driveshaft which can be operatively connected with a drive aggregate of the motor vehicle, and with an output shaft which can be operatively connected with the first wheel axle are provided, wherein the input shaft is operatively connected with the output shaft and with the first and the second connecting shaft via the coupler mechanism, so as to divide the torque. A torque transmission from the transmission device in the direction of the second wheel axle is thus not accomplished with only one connecting shaft or cardan shaft, as is common, but rather with at least two connecting shafts, i.e., the first and the second connecting shafts. The first connecting shaft is or can be coupled with the first subaxle of the second wheel axle. The second connecting shaft in contrast is or can be coupled with the second subaxle of the second wheel axle. Because the torque transmission to the two subaxles occurs separate from each other via the two connecting shafts, an otherwise required axle differential, which would be assigned to the second wheel axle, can be integrated in the coupler mechanism. The coupler mechanism is thus constructed as dual differential, which integrates a center differential as well as an axle differential in one structural unit. Correspondingly a space-saving arrangement in the region of the second wheel axle is possible.

The invention of course also relates to a motor vehicle with a transmission device which is preferably constructed in the aforementioned manner. The motor vehicle has a first wheel axle and a second wheel axle, wherein the second wheel axle consists of at least the first subaxle and the second subaxle. The motor vehicle is characterized by a first connecting shaft, which is operatively connected with the first subaxle, by a second connecting shaft which is operatively connected with the second subaxle, and by a coupler mechanism with an input shaft, which is operatively connected with a drive aggregate of the motor vehicle, and by an output shaft which is operatively connected with the first wheel axle, wherein the input shaft is operatively connected with the output shaft and with the first and the second connecting shaft via the coupler mechanism so as to divide a torque.

The operative connection via the coupler mechanism divides a torque. This means that a part of the torque which is provided by the input shaft is provided on the output shaft and a further part of the torque, is provided for example in equal proportions on the first and the second connecting shafts. In particular an uneven torque distribution between the first wheel axle and the second wheel axle can be achieved, for example in the ratio of 40:60. Hereby as explained above, the torque provided to the second subaxle is divided, for example equally, to the first subaxle and the second subaxle. The first connecting shaft and also the second connecting shaft are preferably constructed as a cardan shaft.

In a preferred embodiment of the invention the coupler mechanism has a first planetary transmission and a second planetary transmission, which is directly operatively connected with the first planetary transmission, wherein the input shaft and the output shaft are directly operatively connected with the first planetary transmission and the first connecting shaft and the second connecting shaft are directly operatively connected to the second planetary transmission. The coupler mechanism thus integrates two planetary transmissions, i.e., the first planetary transmission and the second planetary transmission. The first planetary transmission hereby for example represents the center differential, while the second planetary transmission functions as axle differential for the second wheel axle. The two planetary transmissions are operatively connected with each other. The input shaft and the output shaft are directly connected to the first planetary transmission, while the two connecting shafts are directly connected to the second planetary transmission. The term direct operative connection or respectively direct connection means that the mentioned shafts are respectively coupled with an element of the corresponding planetary transmission, so that the operative connection does not extend via the respective other planetary transmission. The operative connection between the first planetary transmission and the second planetary transmission is for example provided in such a manner that the ring gears of the planetary transmissions are directly operatively connected with each other or are constructed as a common ring gear.

A preferred embodiment of the invention provides that the first planetary transmission has a sun gear, a first ring gear and a first planet carrier with at least one planet gear which meshes with the first sun gear and the first ring gear, wherein the first planet carrier is operatively connected with the input shaft and the first sun gear is operatively connected with the output shaft. The first planetary transmission thus has the known construction with sun gear, ring gear and planet gears arranged on the planet carrier. The planet gear is arranged rotatable on the planet carrier and meshes with the first sun gear as well as with the first ring gear, i.e., it establishes an operative connection between them. The input shaft is connected to the planet carrier and the output shaft is connected to the first sun gear.

In a preferred embodiment of the invention the second planetary transmission has a second sun gear, a second ring gear and a second planet carrier, wherein the second planet carrier is operatively connected with the first or the second connecting shaft and the second sun gear with the respective other connecting shaft. The second planetary transmission thus also has the sun gear, the ring gear and the planet carrier. Generally there are two different possible configurations for the transmission device. For example the first connecting shaft can be connected to the second planet carrier, while the second sun gear is connected to the second connecting shaft. Vice versa of course the second connecting shaft can also be connected to or operatively connected to the second planet carrier, and the first connecting shaft to the second sun gear.

A further refinement of the invention provides that the second planet carrier has at least one outer planet gear, and at least one inner planet gear, which mesh with each other, wherein the outer planet gear meshes with the second ring gear and the inner planet gear meshes with the second sun gear. The second planetary transmission differs from the first planetary transmission in so far as it is configured as a dual planetary transmission. Correspondingly the outer planet gear and also the inner planet gear are provided via which the second ring gear and the second sun gear are operatively connected with each other. The outer planet gear and the inner planet gear are rotatably arranged on the second planet carrier. They mesh with each other, while at the same time the outer planet gear engages in the second ring gear and the inner planet gear engages in the second sun gear. The outer planet carrier and the inner planet gear can be arranged at different radial positions relative to a rotation axis of the second planet carrier.

In an advantageous embodiment of the invention the operative connection between the second connecting shaft and the second planet carrier is accomplished via a gear stage, or the operative connection between the second connecting shaft and the second sun gear is accomplished via a further gear stage or via a rotation-direction maintaining gear mechanism. Also in this case there are two design options for the transmission device. Thus the second connecting shaft can either be connected to the second planet carrier or alternatively to the second sun gear. In the first case there is for example one gear stage, wherein for example a first gearwheel is provided on the second planet carrier or is operatively connected to the second planet carrier, while a further gearwheel, which meshes with this gearwheel, is present on the second connecting shaft.

On the other hand, when the second connecting shaft is to be operatively connected to the second sun gear, it is present via the further gear stage or via the rotation direction maintaining coupling. Regarding the further gear stage the same applies as mentioned for the first gear stage. The rotation-direction maintaining coupler is a transmission device which has the same direction of rotation at its input as at its output. For example the coupler is configured as continuously variable transmission or as gear mechanism with an intermediate stage, i.e., as rotation direction maintaining gear mechanism.

In a further embodiment of the invention, the coupler mechanism has at least one clutch by means of which the second planetary carrier or the second sun gear can be fixed at least partially, in particular completely relative to the first planet carrier. Preferably of course two clutches are provided, wherein by means of a first clutch the second planet carrier and by means of a second clutch the second sun gear can be fixed at least partially in particular completely relative to the first planet carrier. With such a configuration of the coupler mechanism a torque distribution between the first and the second wheel axle can be accomplished. In particular the torque or a portion of the torque can be transferred from the first wheel axle either to the first subaxle or the second subaxle of the second wheel axle in a targeted manner. Correspondingly a torque vectoring by means of a single transmission device can be realized. When two clutches are provided as described above a torque can be transferred from the first wheel axle to the first subaxle, the second subaxle or both in a targeted manner by actuating the respective clutch. When the clutch is actuated so that the fixing is only partial, a slip results between the second planet carrier or the second sun gear and the first planet carrier. When on the other hand a complete fixing is provided a slip-free connection is generated.

In a preferred embodiment of the invention the first ring gear and the second ring gear are configured as common ring gear of the first and the second planetary transmission. In this way the operative connection between the first planetary transmission and the second planetary transmission is accomplished in a simple manner via the ring gears.

A refinement of the invention provides that the first connecting shaft is connectable with the first subaxle via a first transmission unit, and the second connecting shaft is connectable with the second subaxle via a second transmission unit, which is in particular configured identical to the first transmission unit. Thus the transmission units are provided between the connecting shafts and the respective subaxle. These transmission units can for example in particular have a gear stage, in particular a bevel gear stage. Hereby different transmission units can be provided for the first subaxle and the second subaxle. However, it is particularly advantageous when the second transmission unit of the second subaxle is identical to the first transmission unit of the first subaxle, to reduce the number of different parts that have to be available at a given point.

Finally it can be provided that the first and the second connecting shaft are arranged coaxial or offset parallel to each other. The former is in particular the case when the first connecting shaft is directly operatively connected with the second planet carrier and the second connecting shaft is directly operatively connected with the second sun gear, i.e., for example without the gear stage mentioned above. The coaxial arrangement of the two connecting shafts enables a very space-saving configuration of the transmission device. The parallel offset arrangement is in particular provided when for example the operative connection of the first connecting shaft extends via the gear stage or the rotation-direction maintaining coupler.

BRIEF DESCRIPTION OF THE DRAWING

In the following, the invention is explained in more detail by way of the drawing, without limiting the invention. It is shown in.

DETAILED DESCRIPTION OF PREFERRED EMBODIMENTS

Figure 1:
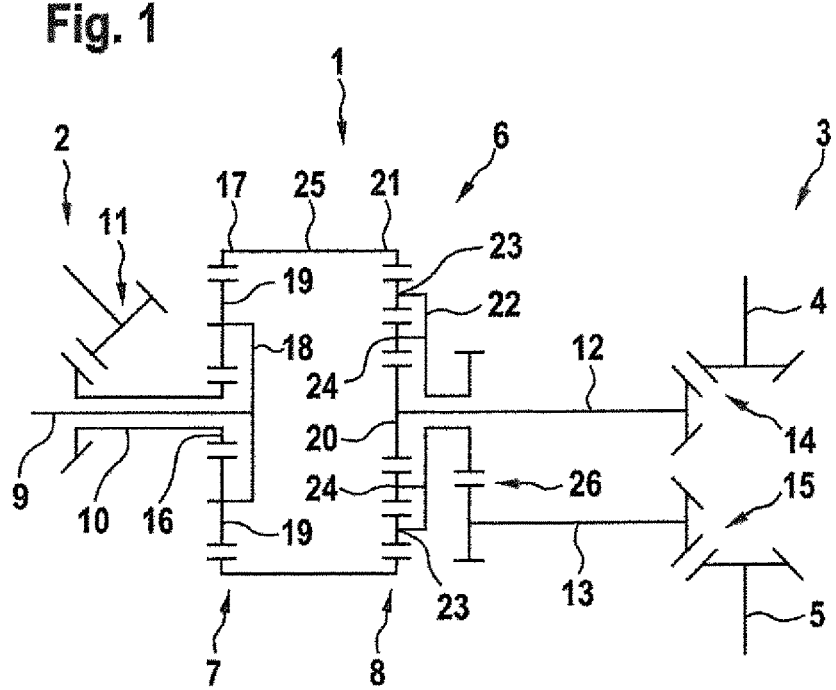
FIG. 1 a first embodiment of the transmission device,
FIG. 2 a first variant of a second embodiment of the transmission device.

FIG. 1 shows a first embodiment of the transmission device 1 of a motor vehicle, which is not further shown here. The motor vehicle has a first wheel axle 2 and a second wheel axle 3, which are here only indicated schematically, wherein the second wheel axle 3 consists of at least a first subaxle 4 and a second subaxle 5. The transmission device 1 has a coupler mechanism 6, which is substantially formed by a first planetary transmission 7 and a second planetary transmission 8. The coupler mechanism 6 has a driveshaft 9, which can be operatively connected with a drive aggregate of the motor vehicle. The coupler mechanism 6 also has an output shaft 10, to which the first wheel axle 2 is connected via a gear stage 11. The operative connection of the coupler mechanism 6 with the second wheel axle 3 or the first subaxle 4 and the second subaxle 5 assigned thereto is accomplished via a first connecting shaft 12 and a second connecting shaft 13. The first connecting shaft 12 is operatively connected with the first subaxle 4 via a first transmission unit 14, which is for example constructed as a gear stage, and the second connecting shaft is operatively connected with the second subaxle 5, via a second transmission unit 15, which for example is also constructed as a gear stage.

The first planetary transmission 7 is formed by a first sun gear 16, a first ring gear 17 and a first planet carrier 18 with at least one planet gear 19. The second planetary transmission 8 on the other hand is formed by a second sun gear 20, a second ring gear 21 and a second planet carrier 22. On the second planet carrier 22 at least one outer planet gear 23 and at least one inner planet gear are rotatably supported. The planet gear 19, which is rotatably connected to the first planet carrier 18, meshes with the first sun gear 16 as well as with the first ring gear 17. In the case of the second planetary transmission 8 on the other hand the outer planet gear 23 meshes with the inner planet gear 24 and also with the second ring gear 21. The inner planet gear 24 on the other hand meshes with the outer planet gear 23 and with the second sun gear 20. An operative connection between the second sun gear 20 and the second ring gear 21 is thus accomplished via the outer planet gear 23 and the inner planet gear 24.

The planetary transmissions 7 and 8 are operatively connected with each other. In the here presented exemplary embodiment this is implemented by configuring the ring gears 17 and 21 as common ring gear 25. However, the operative connection between the ring gears 17 and 21 can also be accomplished in a different way. The drive shaft and the output shaft 10 are directly operatively connected with the first planetary transmission and the two connecting shafts 12 and 13 are directly operatively connected with the second planetary transmission 8. In this exemplary embodiment the input shaft 9 is directly operatively connected to the first planet carrier 18 and the output shaft 10 with the first sun gear 60. On the other hand the first connecting shaft 12 is directly operatively connected with the second sun gear 20 and the second connecting shaft 13 with the second planet carrier 22 via a gear stage.

Figure 2:
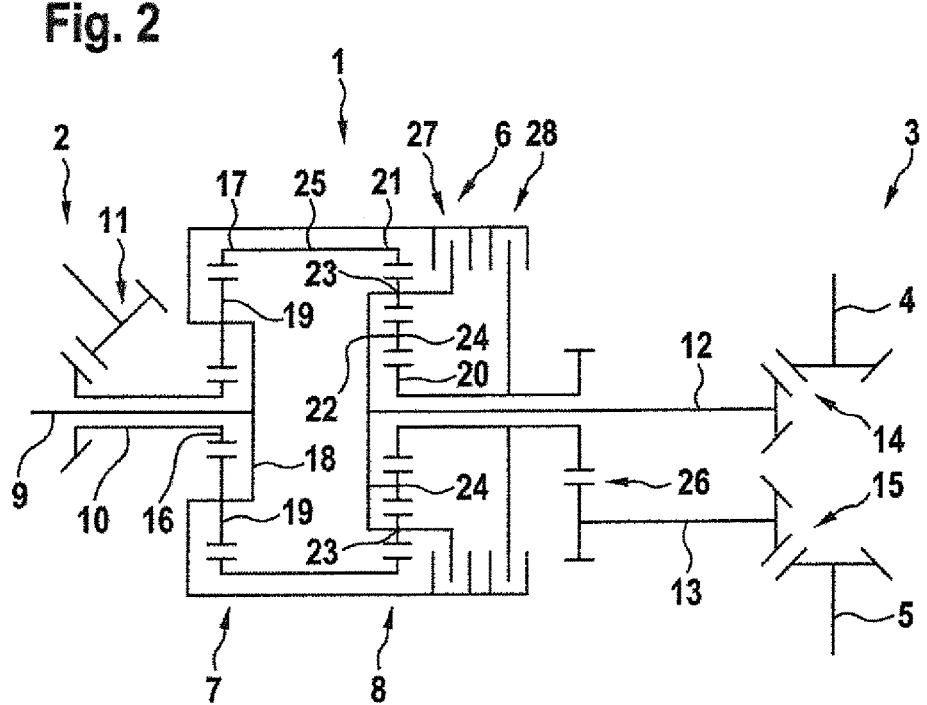

FIG. 2 shows a first variant of the second embodiment of the transmission device 1. This variant is generally constructed similar to the first embodiment, so that in so far reference is made to the above description. In the following only the differences are discussed. These are mainly related to the second planetary transmission 8. It is provided that the first connecting shaft 12 is directly connected to the second planet carrier 22, while the second connecting shaft 13 is connected to the second sun gear 20 via the gear stage 26.

This arrangement makes it possible to provide two clutches 27 and 28. By means of the clutch 27 the second planet carrier 22 can be fixed at least partially in particular completely relative to the first planet carrier 19. By means of the clutch 28 on the other hand, the second sun gear 20 can be fixed at least partially, in particular completely relative to the first planet carrier 18. By means of the clutches 27 and 28 a torque can be transferred from the first wheel axle 2 either to the first subaxle 4 (by means of the clutch 27) or to the second subaxle (by means of the clutch 28) in a targeted manner. Correspondingly a torque vectoring is realized between the first wheel axis 2 and the second wheel axle 3 or the subaxles 4 and 5. Via the clutches 27 and 28 also an operative connection to the first sun gear 16 can be generated instead of the operative connection to the first planet carrier 18.

In the here shown first variant of the second embodiment of the transmission device 1 the transmission units 14 and 15 are configured mirror inverted. This is also the case for the first embodiment, which is shown in FIG. 1.

Figure 3:
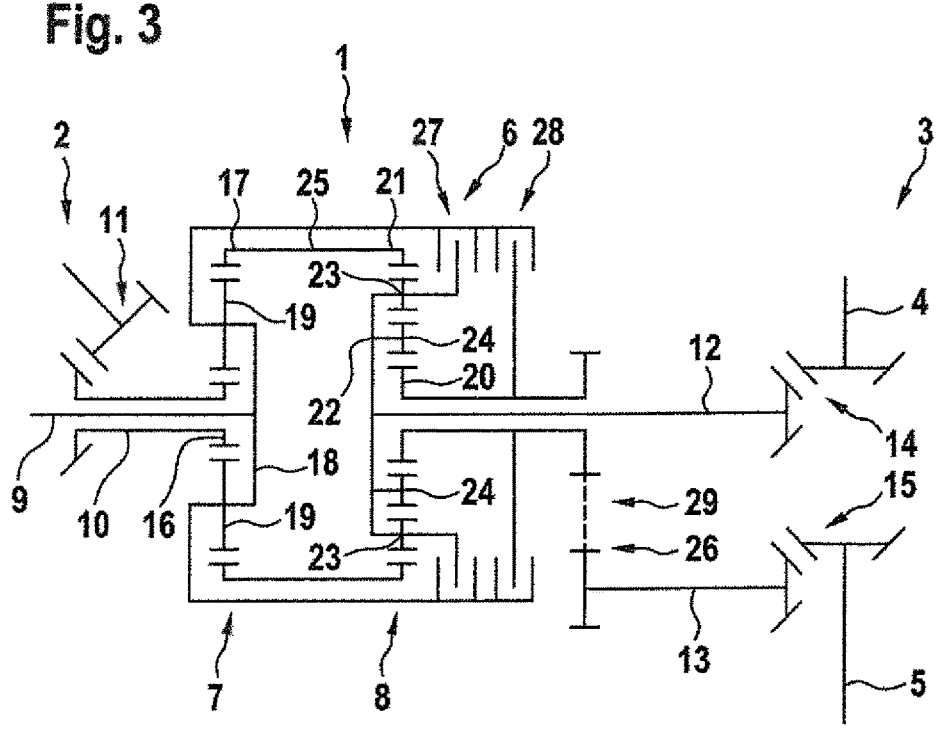
FIG. 3 a second variant of the second embodiment,
FIG. 4 a third variant of the second embodiment, and
FIG. 5 a fourth variant of the second embodiment.

FIG. 3 shows the second variant of the second embodiment. In the following only the differences are discussed. In so far references made to the description above. In this case it is provided that the transmission units 14 and 15 are constructed identical. This has the advantage that the number of different parts to be provided can be reduced. In such a configuration of the transmission units 14 and 15 the collection for example of the second connecting shaft 13 to the second planetary transmission 8 or the coupler mechanism 6 has to be changed. For example in this case a rotation direction maintaining coupling 29 is provided which in the present case is constructed as a variable transmission.

Figure 4:
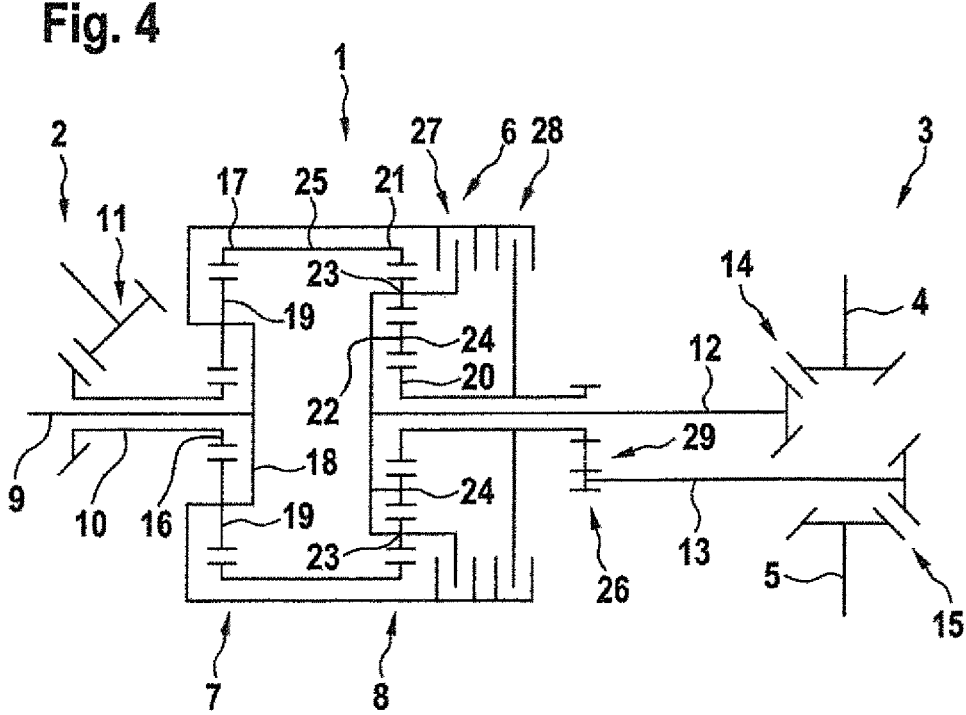

FIG. 4 shows a third variant of the second embodiment of the transmission device 1. Also in this case reference is made to the description above. The difference to the variant described above relates to the arrangement of the transmission units 14 and 15 relative to each other. Due to the here chosen design these can be arranged relative to each other in a space-saving manner or can even be present in one transmission module.

Figure 5:
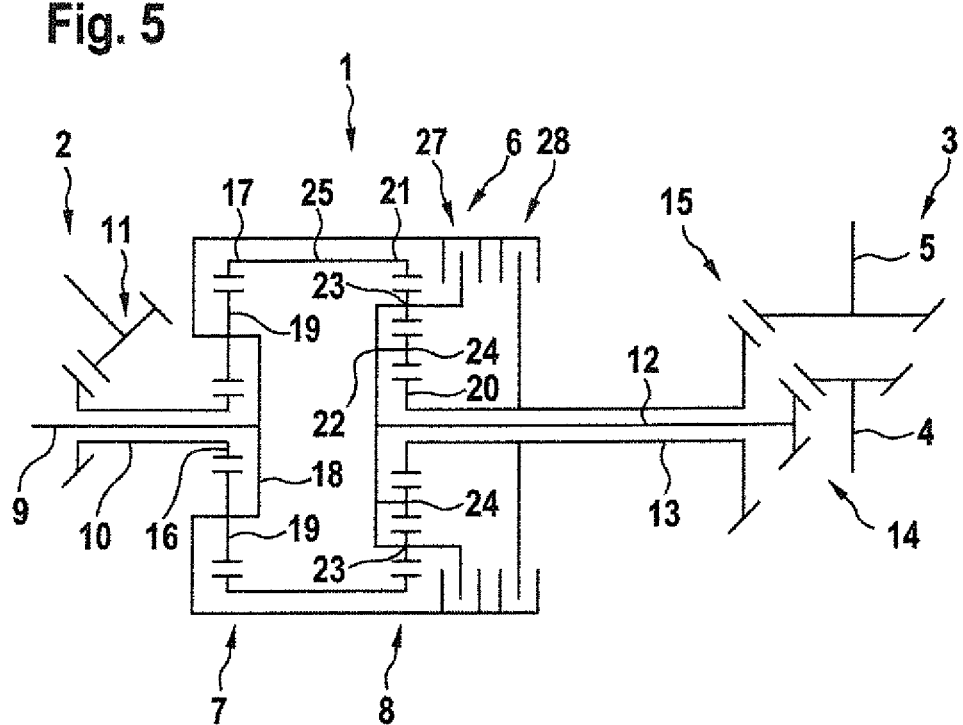

FIG. 5 shows a fourth variant of the second embodiment of the transmission device 1. Again reference is made to the description above. While the connecting shafts 12, 13 were arranged parallel offset to each other in the embodiments described so far, they are now arranged coaxial to each other. In this way a very space-saving arrangement of the transmission units 14 and 15 or an integration into one transmission module is possible.

What is claimed is:

1. A transmission device of a motor vehicle comprising:
a first connecting shaft operatively connectable to a first subaxle of a wheel axle of the motor vehicle;
a second connecting shaft operatively connectable to a second subaxle of the wheel axle; and
a coupler mechanism having an input shaft operatively connectable with a drive aggregate of the motor vehicle, and an output shaft operatively connectable with another wheel axle of the motor vehicle, said coupler mechanism operatively connecting the input shaft with the output shaft and the first and the second connecting shafts so as to distribute a torque between the output shaft, the first connecting shaft and the second connecting shaft,
wherein the coupler mechanism comprises a first planetary transmission and a second planetary transmission, said second planetary transmission operatively connected with the first planetary transmission, wherein the input shaft and the output shaft are directly operatively connected with the first planetary transmission, and the first and second connecting shafts are operatively connected with the second planetary transmission,
wherein the first planetary transmission has a first sun gear, a first ring gear and a first planet carrier with at least one planet gear which meshes with the first sun gear and the first ring gear, and wherein the first planet carrier is directly operatively connected with the input shaft and the first sun gear is directly operatively connected with the output shaft,
wherein the second planetary transmission has a second sun gear, a second ring gear and a second planet carrier, wherein the second planet carrier is operatively connected with one of the first and second connecting shafts and the second sun gear is operatively connected with another one of the first and second connecting shafts,
wherein the first connecting shaft and the second planet carrier are operatively connected to each other via a gear stage or the first connecting shaft and the second sun gear are operatively connected with each other via a further gear stage.

2. The transmission device of claim 1, wherein the second planet carrier has at least one outer planet gear and at least one inner planet gear which mesh with each other, wherein the outer planet gear meshes with the second ring gear and the inner planet gear meshes with the second sun gear.

3. The transmission device of claim 1, further comprising a first and a second transmission unit, wherein the first connecting shaft is connectable with the first subaxle via the first transmission unit and the second connecting shaft is connectable with the second subaxle via the second transmission unit.

4. The transmission device of claim 3, wherein the second transmission unit is constructed identical to the first transmission unit.

5. The transmission device of claim 1, wherein the first and the second connecting shafts are arranged coaxial to each other or with a parallel offset to each other.

6. A transmission device of a motor vehicle comprising:
a first connecting shaft operatively connectable to a first subaxle of a wheel axle of the motor vehicle;
a second connecting shaft operatively connectable to a second subaxle of the wheel axle; and
a coupler mechanism having an input shaft operatively connectable with a drive aggregate of the motor vehicle, and an output shaft operatively connectable with another wheel axle of the motor vehicle, said coupler mechanism operatively connecting the input shaft with the output shaft and the first and the second connecting shafts so as to distribute a torque between the output shaft, the first connecting shaft and the second connecting shaft,
wherein the coupler mechanism comprises a first planetary transmission and a second planetary transmission, said second planetary transmission operatively connected with the first planetary transmission, wherein the input shaft and the output shaft are directly operatively connected with the first planetary transmission, and the first and second connecting shafts are operatively connected with the second planetary transmission,
wherein the first planetary transmission has a first sun gear, a first ring pear and a first planet carrier with at least one planet gear which meshes with the first sun gear and the first ring gear, and wherein the first planet carrier is directly operatively connected with the input shaft and the first sun pear is directly operatively connected with the output shaft,
wherein the second planetary transmission has a second sun gear, a second ring gear and a second planet carrier, wherein the second planet carrier is operatively connected with one of the first and second connecting shafts and the second sun gear is operatively connected with another one of the first and second connecting shafts,
wherein the coupler mechanism has at least one clutch, said second planet carrier or the second sun gear being at least partially fixable relative to the first planet carrier by the clutch.

7. The transmission device of claim 6, wherein the second planet carrier or the second sun gear is at least completely fixable relative to the first planet carrier by the clutch.

8. The transmission device of claim 6, wherein the second planet carrier has at least one outer planet gear and at least one inner planet gear which mesh with each other, wherein the outer planet gear meshes with the second ring gear and the inner planet gear meshes with the second sun gear.

9. The transmission device of claim 6, further comprising a first and a second transmission unit, wherein the first connecting shaft is connectable with the first subaxle via the first transmission unit and the second connecting shaft is connectable with the second subaxle via the second transmission unit.

10. The transmission device of claim 9, wherein the second transmission unit is constructed identical to the first transmission unit.

11. The transmission device of claim 6, wherein the first and the second connecting shafts are arranged coaxial to each other or with a parallel offset to each other.

12. A transmission device of a motor vehicle comprising:
a first connecting shaft operatively connectable to a first subaxle of a wheel axle of the motor vehicle;
a second connecting shaft operatively connectable to a second subaxle of the wheel axle; and
a coupler mechanism having an input shaft operatively connectable with a drive aggregate of the motor vehicle, and an output shaft operatively connectable with another wheel axle of the motor vehicle, said coupler mechanism operatively connecting the input shaft with the output shaft and the first and the second connecting shafts so as to distribute a torque between the output shaft, the first connecting shaft and the second connecting shaft, wherein the coupler mechanism comprises a first planetary transmission and a second planetary transmission, said second planetary transmission operatively connected with the first planetary transmission, wherein the input shaft and the output shaft are directly operatively connected with the first planetary transmission, and the first and second connecting shafts are operatively connected with the second planetary transmission, wherein the first planetary transmission has a first sun gear, a first ring gear and a first planet carrier with at least one planet gear which meshes with the first sun gear and the first ring gear, and wherein the first planet carrier is directly operatively connected with the input shaft and the first sun gear is directly operatively connected with the output shaft, wherein the second planetary transmission has a second sun gear, a second ring gear and a second planet carrier, wherein the second planet carrier is operatively connected with one of the first and second connecting shafts and the second sun gear is operatively connected with another one of the first and second connecting shafts, wherein the first ring gear and the second ring gear are configured as common ring gear of the first and the second planetary transmission.

13. The transmission device of claim 12, wherein the second planet carrier has at least one outer planet gear and at least one inner planet gear which mesh with each other, wherein the outer planet gear meshes with the second ring gear and the inner planet gear meshes with the second sun gear.

14. The transmission device of claim 12, further comprising a first and a second transmission unit, wherein the first connecting shaft is connectable with the first subaxle via the first transmission unit and the second connecting shaft is connectable with the second subaxle via the second transmission unit.

15. The transmission device of claim 14, wherein the second transmission unit is constructed identical to the first transmission unit.

16. The transmission device of claim 12, wherein the first and the second connecting shafts are arranged coaxial to each other or with a parallel offset to each other.

* * * * *